United States Patent [19]
Boileau

[11] 3,861,439
[45] Jan. 21, 1975

[54] LIGHT-WEIGHT HEAVY-DUTY RADIAL TIRE

[75] Inventor: Jacques Boileau, Clermont-Ferrand, France

[73] Assignee: Compagnie Generale Des Etablissements Michelin, raison sociale Michelin & Cie, Clermon-Ferrand (Puy-de-Dome), France

[22] Filed: Dec. 15, 1972

[21] Appl. No.: 315,574

[30] Foreign Application Priority Data
Dec. 31, 1971    France .............................. 71.47885

[52] U.S. Cl. ................................. 152/359, 152/356
[51] Int. Cl. .................................................. B60c 9/08
[58] Field of Search ........... 152/354, 356, 357, 359, 152/361 R, 362 R, 352

[56] References Cited
UNITED STATES PATENTS

| | | | |
|---|---|---|---|
| 2,493,614 | 1/1950 | Bourdon | 152/356 |
| 2,939,502 | 6/1960 | Hindin et al. | 152/352 |
| 3,509,929 | 5/1970 | Delobelle | 152/354 |
| 3,709,276 | 1/1973 | Montague | 152/362 |
| 3,735,791 | 5/1973 | McKissick et al. | 152/352 |
| 3,736,974 | 6/1973 | LeJeune | 152/362 R |

Primary Examiner—Lloyd L. King
Assistant Examiner—Robert Saifer
Attorney, Agent, or Firm—Brumbaugh, Graves, Donohue & Raymond

[57] ABSTRACT

A light-weight heavy-duty radial tire is formed with at least one carcass ply and at least two tread plies. The tensile strength T, expressed in kilograms, of the plies per centimeter of ply width is reduced to a value between 5 and 15 times the inner radius R, expressed in centimeters, of the tire in the median plane. The tire is of substantially reduced weight and is inflated to a pressure which is 20% to 30% less than the nominal inflation pressure for conventional tires of the same size bearing the same load.

11 Claims, 3 Drawing Figures

LIGHT-WEIGHT HEAVY-DUTY RADIAL TIRE

BACKGROUND OF THE INVENTION

This invention relates to tires of the radial-carcass type for heavy vehicles (buses, trucks, civil engineering equipment, etc.). The new tires have novel and highly-effective reinforcements of reduced strength, weight and cost, yet the tires perform better than conventional tires.

Radial tires have two reinforcements, namely a carcass reinforcement, which reinforces primarily the sidewalls, and a crown reinforcement, which reinforces only the tread.

The carcass reinforcement comprises cords anchored in each bead on one or more bead wires, extending from one bead to the other, and arranged in radial planes of the tire. In the case of tires for heavy vehicles, these cords frequently consist of steel cords and then form a single carcass ply; they may on the other hand consist of another material such as rayon, polyester or polyamide, and in this case they are always distributed in a plurality of plies superimposed on each other over their entire length from one bead to the other.

The tread reinforcement comprises a plurality of superimposed plies of cords located between the carcass and the tread. It extends substantially over the entire width of the tread. The cords are arranged along at least two directions, generally symmetrical with respect to the median plane of the tire and respectively forming clockwise and counterclockwise angles of between 15° and 30° with the median plane. The tread reinforcement generally comprises additional cords triangulating the preceding ones and forming angles of between 60° and 90° with respect to the median plane. In the case of tires for heavy vehicles, the tread reinforcement is practically always formed of steel cords distributed in a minimum number of plies, that is to say, in two or three plies. One can, however, conceive of using another material and a number of plies or directions of cords greater than three. For the sake of completeness, it should be pointed out that the tread reinforcement is frequently protected by a ply of elastic metal cables that forms no part of the tread reinforcement proper and is intended merely to dampen shocks or to avoid punctures.

An important characteristic of a ply, whether a tread ply or a carcass ply, is its tensile strength per centimeter of width. This characteristic figure is merely the product of the tensile strength of a cord by the average number of cords in one centimeter of width of ply. The tensile strength per centimeter of a ply is designated below by the symbol T.

The selection of the tensile strength T per centimeter of a tread ply or a carcass ply depends on variables in the manufacture and use of the tire: inflation pressure, angle of the cords with respect to the median plane, geometrical dimensions of the tire; and also on the determination of the rated load and of the coefficient of safety (the latter allowing for static and dynamic overloads). However, in accordance with an empirical finding, under practical conditions of manufacture and use of the tires, the tensile strength $T_t$ (expressed in kilograms) of the steel-cord tread plies of radial tires for heavy vehicles is always between 15 and 40 times, and generally between 20 and 30 times, the inner radius (expressed in centimeters) of the inflated tire not under load; and the tensile strength $T_c$ of the carcass ply (or of the assembly of carcass plies) is within the same limits, with a tendency to be less than the strength $T_t$. The fixing, within such ranges, of $T_t$ and $T_c$ corresponds to standards of manufacture and use of radial tires for heavy vehicles that are far from optimizing performance and the cost.

SUMMARY OF THE INVENTION

An object of the invention is to provide, in a radial tire for heavy-duty vehicles, tread and carcass reinforcements having tensile strengths $T_t$ and $T_c$, respectively, that are within a range such that the tire performs better and costs less than conventional tires.

The foregoing and other objects are attained in accordance with the invention by the provision of a tire comprising a radial carcass formed of at least one ply and a tread reinforcement formed of at least two plies, each different direction of cords corresponding either to a single ply, called the standard ply, or to a plurality of plies that are a submultiple of a standard ply and that are equivalent jointly to one standard ply. The tire is characterized in that the tensile strength per centimeter $T_t$ or $T_c$ expressed in kilograms, of a standard tread reinforcement ply or of a standard carcass reinforcement ply is between 5 and 15 times the inner radius R of the tire, expressed in centimeters.

The ratio indicated is preferably applied both to each standard tread reinforcement ply and to the standard carcass reinforcement ply. It may, however, be applied to less than all of the standard plies: e.g., to one of the standard tread reinforcement plies only or to the standard carcass reinforcement ply only. It goes without saying that a group of two plies the cords of which are not strictly parallel but form with each other an angle not exceeding, for instance, 15° or 20° must be considered as equivalent to two halves of a standard ply the cords of which are arranged along an intermediate direction.

The inner radius of the tire is, of course, the radius of the circle of intersection of the inner surface of the tire with the median plane of the tire.

As can be seen, in a tire in accordance with the invention, the strength of the reinforcements, and therefore the quantity of reinforcement material—for instance of steel cords—is of the order of half or even less than half that of the reinforcements used in conventional tires. This considerable reduction in weight is possible without any substantial change in the rated load of the tire if the tire is inflated to a pressure that is reduced by about one-quarter from the value customarily employed for the same size and for the same load. With this change in pressure, the reduction in weight does not result in excessive fragility and facilitates a remarkable improvement in performance: the road-holding characteristics and stability are increased, the mileage traveled before the tire is worn out is lengthened, and the riding comfort is improved. This is due in particular to the fact that the lightening of the reinforcement and the reduction of the pressure lead to an increase of the surface area of the zone of contact of the tire with the road, as well as of the amount of side wall deformation, for a given load.

In order to ensure increased life of a tire in accordance with the invention and take into account the fact that a reduction in inflation pressure results in deformations of increased amplitude, and therefore more severe stresses, a number of features are preferably employed:

First, it is desirable to use a single carcass ply in order to reduce the shearing between the plies in the side walls subjected to increased deformations. This arrangement is valid both for a carcass of steel cables and for a carcass of textile cords, for instance of polyamide. Here again, a decrease in weight and an increase in flexibility go hand-in-hand with long life.

Second, it is desirable to stabilize the beads on the rim as well as possible: increased flexure of the side walls when traveling under low pressure has a tendency to displace the beads if they are not securely fastened on the rim. In this respect, several solutions can be employed. In particular, it is desirable, in order to anchor the carcass ply, to provide bead wires formed of three elements that are tangent two by two and therefore have different diameters. Such bead wires are particularly rigid in torsion and secure and beads fast to the rim.

Another solution involves reinforcing the bead by extending well up into the side walls the portions of the carcass that are turned around the bead wires. It is advisable that the doubled-back portions extend over at least a third of the height of the side walls. They may in fact extend up to points below the tread reinforcement. It is necessary, however, that the superimposing of the doubled-back portion and of the carcass proper in each side wall not prevent the flexing of the latter, particularly at the junction with the bead. To this end, the doubled-back portions can be laid along curved paths that move locally away from the carcass proper and are locally longer than those of the carcass proper, so that each doubled-back portion has, as compared to the adjacent portion of the carcass proper, an additional or reserve length. In practice, long doubled-back portions are suitable only in the case of a carcass formed of a ply of very elastic cords, for instance of polyamide, the fatigue strength and elasticity of which are substantial.

Third, it is advisable to lighten the junction between the carcass and the tread reinforcement. Since the two reinforcements, being light and flexible, deform more upon passage into the area of contact of the tire with the road, it is advisable, in order to avoid excessive heating of the bonding rubber, to interpose between the two reinforcements only a relatively thin bonding layer: e.g., a layer having a thickness between one-half and twice the thickness of one ply. In conventional tires, the difference between the rigidity of the tread reinforcement and the rigidity of the carcass is quite substantial, and the bonding rubber between the two reinforcements generally has a much greater thickness.

Fourth, it is desirable to render the tread more flexible, since its area of contact with the road is increased by the reduced inflation pressure. The increased flexibility can be ensured by a reduction of the thickness of the tread and an increase in the fraction of the thickness involved in the tread grooves.

The thickness of the tread may be limited to about four times the thickness of the tread reinforcement. Since in accordance with the invention the tread reinforcement is lightened in weight and thinned, this leads to reducing the thickness of the tread by about 20%.

The tread grooves may also have a depth which amounts to approximately three-quarters of the thickness of the tread. In general, road tires of considerable size have a tread which is carved to a depth that does not exceed two-thirds of the thickness of the tread.

BRIEF DESCRIPTION OF THE DRAWING

An understanding of other aspects of the invention can be gained from a consideration of the following detailed description of the preferred embodiments thereof, in conjunction with the appended figures of the drawing, wherein.

DESCRIPTION OF THE PREFERRED EMBODIMENTS

The figures show a tire of the radial type of size 11-22.5 for heavy vehicles. The same reference numbers in the different figures designate the same components.

Figure 1:
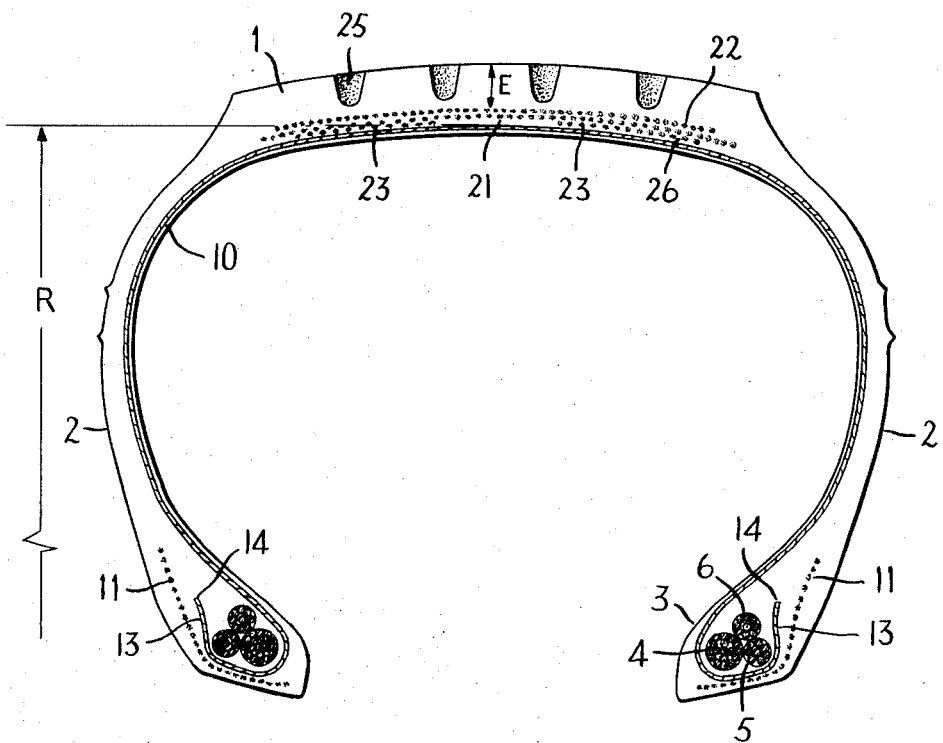
FIG. 1 is a view in radial section of a tire in accordance with the invention having crown and carcass reinforcements of steel cords.
Figure 2:
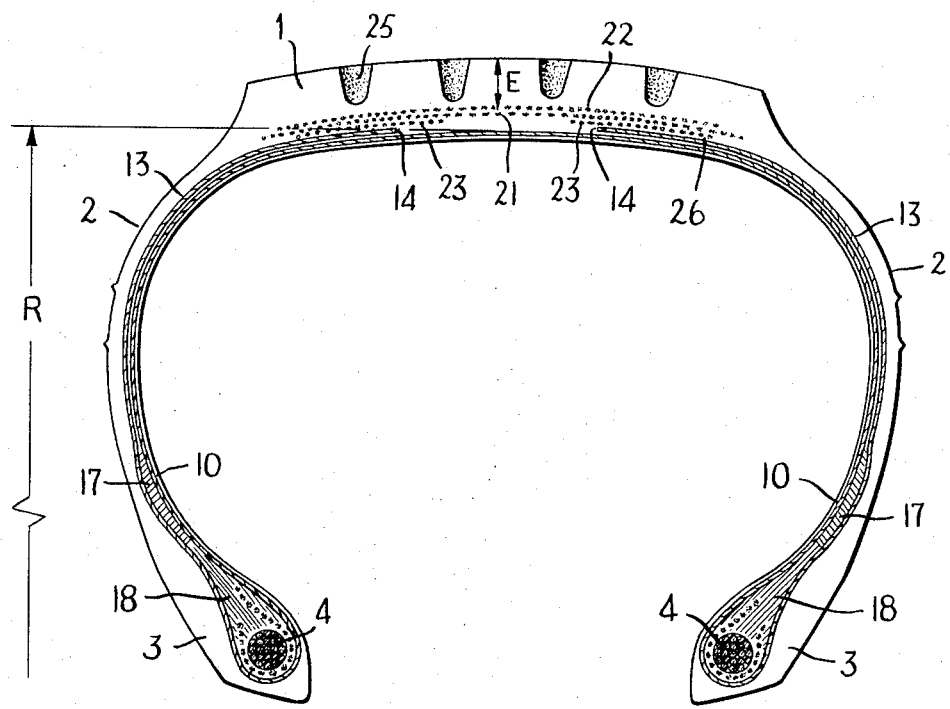
FIG. 2 is a view in radial section of another tire in accordance with the invention having a carcass of polyamide cords and a tread reinforcement of steel cords.

There can be noted the tread 1, the side walls 2 terminating in beads 3 provided with composite bead wires 4, 5, 6 (FIG. 1), or unit bead wires 4 (FIG. 2).

In the case of FIG. 1, the bead wires are composite and composed of three elements 4, 5, 6 of circular cross section which are tangent two by two, each formed of a number of concentric layers of steel wires. The three elements 4, 5, 6 are at different distances from the axis of the tire, the closest elements 4 and 5 being substantially at the same distance from the base of the beads 3. The composite bead wires 4, 5, 6 (FIG. 1) are disclosed and claimed in a prior application of Daniel Lejeune Ser. No. 122,934, filed Mar. 10, 1971, now U.S. Pat. No. 3,736,974 for "Tire Having Bead Wires Tangent To One Another," and per se are not my invention.

In the case of FIG. 2, the bead wire 4 is formed of a single element of slightly larger cross-section.

Figure 3:
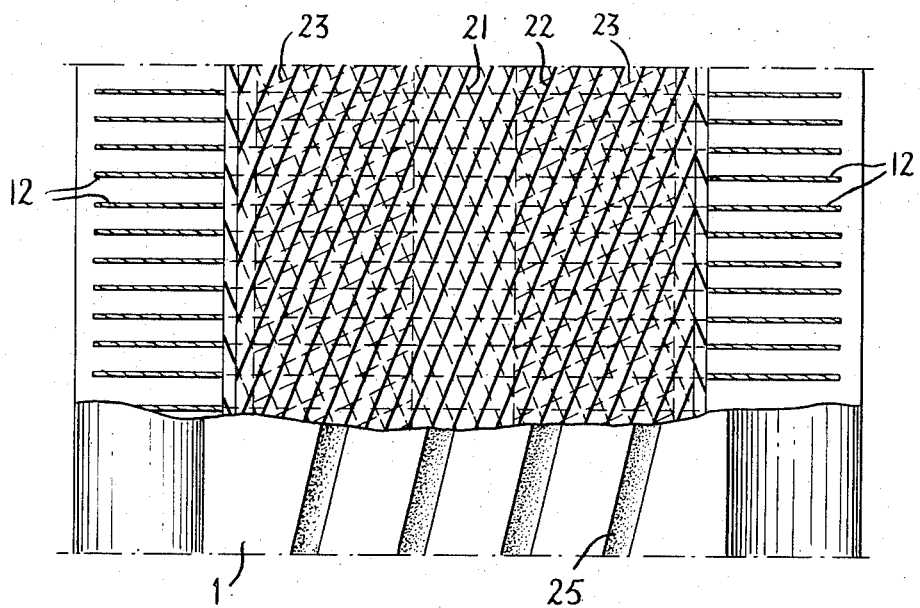
FIG. 3 is a plan view of a sector of the tread of the tire of FIG. 1 (or FIG. 2) partially broken away to show the orientation of the cords of the carcass and of the tread reinforcement.

As FIGS. 1 to 3 show, the carcass 10 comprises a single ply of cords 12 arranged in radial planes. It is anchored around the bead wires 4 or 4, 5, 6 and extends from one bead 3 to the other bead, moving through the two side walls 2 and under the tread 1.

In the case of FIG. 1, the carcass ply 10 of steel cords is extended, after turning around the bead wires 4, 5, 6, by short upward-extending portions 13 terminating at 14 near the bead wires. The beads 3 are also reinforced by stiffeners 11 of steel cables.

In the case of FIG. 2, the carcass ply 10, of polyamide cords, is extended by long upward-turned portions 13 terminating at points 14 below the tread. The upward-bent portions 13 are spaced locally from the main ply 10 by rubber cushions 17 of lenticular cross-section and by rubber bead fillers 18 of generally triangular cross-section. The rubber cushions 17 impart to the upward-extending portions 13 a reserve or additional length as compared with the ply 10 proper.

The tread reinforcement comprises two plies 21 and 22 of steel cords inclined symmetrically by angles of 22° clockwise and counterclockwise, respectively, with respect to the median plane of the tire and two narrow plies 23 arranged between the plies 21 and 22 on the one hand and the carcass 10 on the other. The plies 23 comprise steel cords identical to the cords of plies 21 and 22 but inclined at an angle of 65° with respect to the median plane of the tire. The tread reinforcement assembly formed by the plies 21, 22 and 23 has a thickness of 5 mm.

The tread 1 is provided with grooves 25 the zigzag outline of which is conventional. The depth of these grooves is 12 mm for a thickness E of tread of 16 mm.

Furthermore, it can be noted from FIGS. 1 and 2 that the plies 23, which are the plies of the tread reinforcement closest to the carcass 10 and its upward-turned portions 13, are separated from the latter only by a layer of bonding rubber 26 the thickness of which is similar to that of a ply 21 to 23.

The upward-turned portions 13 (FIG. 2) can terminate just above the rubber cushions 17. However, it is preferable to extend them up to points below the tread and tread reinforcement in order to obtain additional protection for the main portion of the carcass 10, particularly in the zone of the shoulders and edges of the plies 21 to 23.

Preferred characteristics of the steel or polyamide cords used in accordance with the invention are set forth in the following table and compared to the characteristics of the cords used in a conventional control tire of the same size and which is widely used.

of tires in accordance with the invention and the control tire.

|  | Tire in accordance with the invention | Control tire |
|---|---|---|
| Carcass: |  |  |
| $T_c/R$ for steel cables | 12.24 | 18 |
| for polyamide cables | 12.10 |  |
| Tread reinforcement |  |  |
| $T_t/R$ for steel cables | 12.24 | 23.44 |
| Characteristics of the tire |  |  |
| rated load in kg | 3,000 | 3,000 |
| inflation pressure for the rated load in bars | 6 | 7.75 |
| crushing sag in mm | 50 | 40 |
| weight in kg (steel or polyamide carcass) | 38 | 53 |

As can be seen, the strength per centimeter of the carcass ply is reduced by about one-third as compared with the prior art, that of the tread plies by about one-half, and the total weight by about one-third. The mileage traveled before the tire is worn is, however, superior; and the comfort, road-holding ability and stability are also improved. It is surprising that by substantially lightening the reinforcement of the tire, thus decreasing the cost substantially, and by traveling with an inflation pressure which is less than the present normal values, it is possible to improve the performance of the tire.

Thus there is provided in accordance with the inven-

|  |  | Tire in accordance with the invention (11–22.5) | Control tire (11–22.5) |
|---|---|---|---|
| 1. | Carcass |  |  |
|  | a) of steel cables |  |  |
|  | diameter of single wire in mm | 0.15 | 0.18 |
|  | number of wires per strand | 3 | 3 |
|  | number of strands per cord | 7 | 7 |
|  | nominal spacing of the cords in mm before use, i.e., before deformation by placing in toroidal shape | 1.6 | 1.5 |
|  | rupture force of the cords in kg | 98 | 135 |
|  | tensile strength $T_c$ of the ply in kg per cm of ply width | 612 | 900 |
|  | b) of polyamide |  |  |
|  | denier of the threads | 1880 |  |
|  | number of threads | 2 × 3 |  |
|  | rupture force of the cords in kg | 82 |  |
|  | spacing of the cords in mm before use, i.e., before deformation by placing in toroidal shape | 1.35 |  |
|  | tensile strength $T_c$ of the ply in kg per cm of ply width | 607 |  |
| 2. | Tread reinforcement |  |  |
|  | Steel cables |  |  |
|  | diameter of single wire in mm | 0.15 | 0.23 |
|  | number of wires per strand | 3 | 4 |
|  | number of strands per cord | 7 | 7 |
|  | spacing of cords in mm | 1.6 | 2.5 |
|  | rupture force of cords in kg | 98 | 293 |
|  | tensile strength $T_t$ of the ply in kg per cm of ply width | 612 | 1,172 |

For a tire of size 11–22.5, the radius R of the carcass along the median plane is 50 cm. One can thus determine the ratios $T_c/R$ and $T_t/R$. In the following table there are given comparisons of various characteristics tion a novel and highly-effective radial tire for heavy vehicles. Many modifications of the preferred embodiments disclosed herein will readily occur to those skilled in the art upon consideration of this disclosure.

Accordingly, the scope of the invention is defined only by the following claims.

I claim:

1. A light-weight heavy-duty radial tire comprising a tread, a radial carcass formed of at least one carcass ply of cords, and a tread reinforcement formed of at least two tread plies of cords, said cords of said carcass and tread reinforcement being laid in different directions, each separate direction of cords corresponding to a single standard ply or a plurality of submultiple plies equivalent in combination to one standard ply, and the tensile strength T, expressed in kilograms, per centimeter of ply width of at least one of said standard plies being between 5 and 15 times the inner radius R, expressed in centimeters, of the tire in the median plane, the tire being in an inflated condition but not under load.

2. A tire according to claim 1, wherein said carcass ply consists essentially of a single ply of steel cords.

3. A tire according to claim 1, wherein said carcass ply consists essentially of a single ply of cords of synthetic material.

4. A tire according to claim 1, wherein the tire further comprises a pair of beads and, in each bead, bead wires comprising three elements tangent in pairs, said carcass having an edge turned around the bead wire in each bead.

5. A tire according to claim 1, wherein the tire further comprises a pair of side walls respectively terminating in a pair of beads and, in each bead, a bead wire, said carcass having a portion turned around the bead wire in each bead and doubled back in each side wall over at least one-third the height thereof.

6. A tire according to claim 5, wherein said doubled-back portions are laid along paths that are locally longer than those of the carcass proper, so that each doubled-back portion has, as compared to the adjacent portion of the carcass proper, a reserve length.

7. A tire according to claim 6, wherein said carcass ply is made of very elastic cords and wherein each doubled-back portion extends to a location beneath the tread.

8. A tire according to claim 1, further comprising a bonding rubber interposed between the carcass and the edges of the tread reinforcement, said bonding rubber forming a layer having a thickness between one-half and twice the thickness of one reinforcement ply.

9. A tire according to claim 1, wherein the tread is formed with grooves having a depth which prior to wear of the tread is equal to substantially three-quarters of the thickness of the tread.

10. A tire according to claim 1, wherein the tread reinforcement has a thickness at least as great as one-fourth the thickness of the tread.

11. A tire according to claim 1 inflated to a pressure which is 20 to 30 percent less than the nominal inflation pressure for tires of the same size bearing the same load.

* * * * *